US007007162B1

(12) United States Patent
Lotspiech

(10) Patent No.: US 7,007,162 B1
(45) Date of Patent: Feb. 28, 2006

(54) FORENSIC MEDIA KEY BLOCK FOR IDENTIFYING COMPROMISED KEYS

(75) Inventor: Jeffrey Bruce Lotspiech, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,658

(22) Filed: May 3, 2000

Related U.S. Application Data

(63) Continuation-in-part of application No. 09/358,162, filed on Jul. 20, 1999, now Pat. No. 6,832,319, which is a continuation-in-part of application No. 09/065,938, filed on Apr. 24, 1998, now Pat. No. 6,118,873.

(51) Int. Cl.
    *G06F 17/00* (2006.01)
(52) U.S. Cl. .................. 713/151; 713/152; 713/168
(58) Field of Classification Search ............. 713/193, 713/150–151, 152, 168
    See application file for complete search history.

(56) References Cited

U.S. PATENT DOCUMENTS

| 4,694,491 A | 9/1987 | Horne et al. ............. 380/20 |
| 5,345,505 A | 9/1994 | Pires ..................... 380/20 |
| 5,592,552 A | 1/1997 | Fiat ...................... 380/21 |

OTHER PUBLICATIONS

Sean Burak, "Protecting the Copyright of Digital Audio and Video Content", Retrieved from the internet Feb. 3, 2004: <URL: http://www.cas.mcmaster.ca/~wmfarmer/SE-4C03-01/papers/Burak-dig-media-sec.pdf>.*
Robert Sedgewick, "Algorithms", 1988, Addison-Wesley, 2nd Edition, pp 115-130.*
Gregory Kesden, "Content Scrambling System (CSS): Introduction", Retrieved from the Internet Feb. 3, 2004: <URL:http://www-2.cs.cmu.edu/-dst/DeCSS/Kesden/index.html>.*
Evaluation of revocation systems with a Java test-bed; Munoz, J.L.; Forne, J.; Esparza, O.; Soriano, M.; Jodra, D.; Database and Expert Systems Applications, 2003. Proceedings. 14th International Workshop on Sep. 1-5, 2003 Page(s):450-454.*
Implementation of ECC/ECDSA cryptography algorithms based on Java card;Jin-Hee Han; Young-Jin Kim; Sung-Ik Jun; Kyo-Il Chung; Chang-Ho Seo;Distributed Computing Systems Workshops, 2002. Proceedings. 22nd International Conference on Jul. 2-5, 2002 Page(s):2.*
Novel applications of cryptography in digital communications; Omura, J.K.; Communications Magazine, IEEE vol. 28, Issue 5, May 1990 Page(s):21-29.*

\* cited by examiner

*Primary Examiner*—David Jung
(74) *Attorney, Agent, or Firm*—John L. Rogitz

(57) ABSTRACT

A forensic media key block (MKB) is provided to a clone device, either a software- or hardware-implemented clone, that has gained access to one or more compromised device keys of unknown identity from a set of the device keys in a digital content guard system. Media keys in the forensic MKB are selectively marked as "revoked" and then the ability of the clone to decrypt the MKB to successfully play content is observed. In this way the identity of the compromised key or keys is eventually learned, and the system can then revoke the compromised key or keys system-wide.

17 Claims, 2 Drawing Sheets

OVERALL FLOW

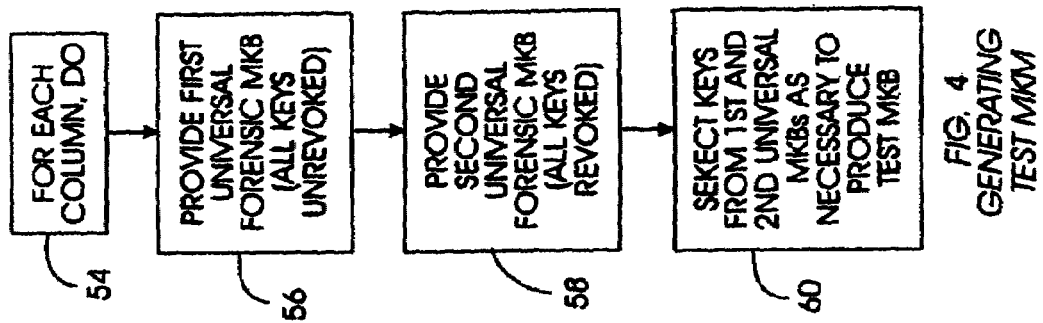
FIG. 4 GENERATING TEST MKM
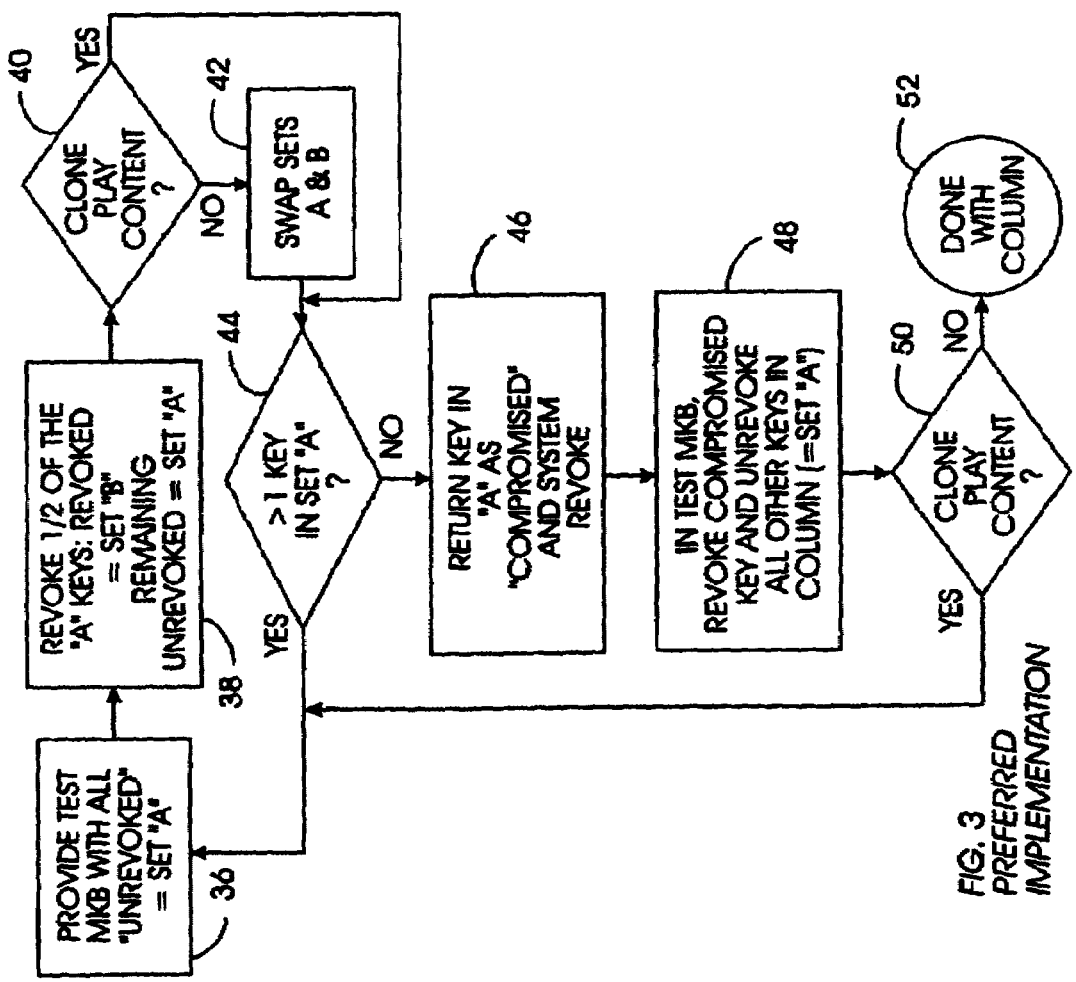
FIG. 3 PREFERRED IMPLEMENTATION

FORENSIC MEDIA KEY BLOCK FOR IDENTIFYING COMPROMISED KEYS

PRIORITY CLAIM

This application is a continuation-in-part of U.S. patent application Ser. No. 09/358,162 filed Jul. 20, 1999, now U.S. Pat. No. 6,832,319 which is a continuation-in-part of U.S. patent application Ser. No. 09/065,938 filed Apr. 24, 1998, now U.S. Pat. No. 6,118,873 incorporated herein by reference.

BACKGROUND OF THE INVENTION

1. Field of the Invention

The present invention relates generally to broadcast data encryption that uses encryption keys, and more particularly to identifying keys that might have been discovered by hardware and/or software "clones" and that consequently have been compromised.

2. Description of the Related Art

The above-referenced applications disclose content guard systems for encrypting publicly sold music, videos, and other content. As set forth in the above-referenced applications, only authorized player-recorders can play and/or copy the content and only in accordance with rules established by the vendor of the content this way, pirated copies of content, which currently cost content providers billions of dollars each year, can be prevented.

In the content guard encryption method disclosed in the above-referenced applications, authorized player-recorders are issued software-implemented device keys from a matrix of device keys. Specifically, the matrix of device keys includes plural rows and columns, and each authorized player-recorder is issued a single key from each column. The keys can be issued simultaneously with each other or over time, but in any event, no player-recorder is supposed to have more than one device key per column of the matrix. Using its device keys, an authorized player-recorder can decrypt content that is contained on, e.g., media such as DVD disks, CDs, hard disk drives, flash memory, and so on that has been encrypted using the device keys. Because the player-recorder is an authorized device that is programmed to follow content guard rules, it then plays/copies the content in accordance with predefined rules that protect copyright owners' rights in digitized, publicly sold content.

Although providing a secure, reliable means to protect copyright in digitized content, the above-referenced applications also anticipate that clone devices might be constructed by pirates. Specifically, a clone device, which would not be programmed with the "rules" that legitimate player-recorders must follow, could use compromised device keys to decrypt content and then copy the content as many times as desired, selling the unauthorized copies or even providing them for free. In either case, the copyright owner loses. Accordingly, the above-referenced applications set forth various ways to deal with clone devices, once the compromised device keys have been identified.

The problem addressed by the present invention is, once a clone has been identified, how to determine which device keys it has and, thus, which keys have been compromised and thus require revoking in accordance with the previous applications. The present invention understands that a "clone" might be a hardware clone or might simply be a computer program that can be made available by, e.g., posting the program on the Internet. In either case, the present invention recognizes that it is desirable to identify the compromised keys possessed by the clone in an efficient way.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

A system is disclosed for identifying one or more compromised device keys of a content guard system. The system includes a test device accessing the compromised device keys, and a media key block (MKB) accessible to the test device. The MKB is a forensic MKB in that it includes plural known media keys at least one of which media keys can be decrypted by the test device using a compromised device key to play content. Also, at least one of the media keys cannot be decrypted by the test device using a compromised device key.

In a preferred embodiment, a forensic test module is accessible to the test device, and the module is programmed with logic. The logic includes attempting to play content by decrypting at least a portion of the forensic MKB using at least one device key. Moreover, the logic includes generating a signal representative of whether the device key is a compromised device key, based on the attempting step. The signal indicates that the device key is a compromised device key when the test device successfully plays the content by using the device key to successfully decrypt at least a portion of the forensic MKB. A valid media key that is useful for decrypting the content is rendered when the device key successfully decrypts at least a portion of the forensic MKB.

As set forth in further detail below, in a preferred implementation the logic further includes providing at least one test MKB having unrevoked media keys establishing a first set, and then revoking a fraction, e.g., one-half, of the media keys in the first set. In accordance with present principles, unrevoked media keys establish the first set and revoked media keys establish a second set. It is then determined whether the test device can successfully play the content, and if not, the keys in the first set are exchanged with the keys in the second set. After exchanging the keys, or if the test device successfully played the content, it is determined whether more than one media key exists in the first set. "Compromised key" is returned when only a single media key exists in the first set. Otherwise, the logic is iteratively repeated. If desired, after "compromised key" has been returned, the compromised key can be revoked, and further compromised keys located using the above logic.

To facilitate providing the test MKB, the logic can provide a first MKB having all keys unrevoked and a second MKB having all keys revoked. The logic then selects keys from the first and second MKBs to render the test MKB.

In another aspect, a computer-implemented method for identifying compromised device keys in a digital content guard system is disclosed. The method includes providing at least one clone with at least one suspected compromised device key, and causing the clone to attempt to play content by decrypting at least a portion of a media key block (MKB) using at least one device key. Also, the method includes generating a signal representative of whether the device key is a compromised device key, based on the attempting act.

In yet another aspect, a computer program device includes a computer program storage device that includes a program of instructions usable by a computer. The instructions include computer readable code means for providing a forensic media key block (MKB). Also, the instructions include computer readable code means for providing a clone having at least one device key compromised from a plurality of device keys in a digital content guard system, with the identity of the compromised device key being initially unknown. Computer readable code means then determine the identity of the compromised device key based on whether the clone can decrypt at least a portion of the forensic MKB using the compromised device key.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a flow chart of a preferred implementation of the logic;
and
FIG. 4 is a flow chart of the logic for generating the test media key block.

DETAILED DESCRIPTION OF THE PREFERRED EMBODIMENTS

Figure 1:
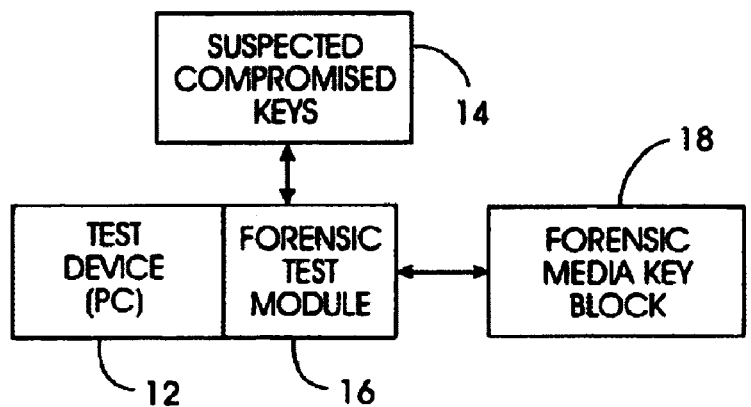
FIG. 1 is a block diagram of the present system.

Referring initially to FIG. 1, a system is shown, generally designated 10, for determining the identity of compromised device keys possessed by a clone of an authorized legitimate player-recorder in a broadcast content guard system, such as but not limited to the system disclosed in the first of the above-referenced applications. By "broadcast" is meant the wide dissemination of a program from a content provider to many users simultaneously over cable (from a satellite source), or wire, or radiofrequency (including from a satellite source), or from widely marketed content disks.

In the particularly preferred architecture shown, the system 10 includes a test device 12. The test device 12 establishes a clone, and the clone can be a hardware player-recorder obtained from a pirate. More likely, however, the sought-after clone with compromised device keys is not a hardware clone, but rather is a software clone such as might be downloaded from the Internet. In this case, the test device 12 is a conventional computer, such as a personal computer (PC) or laptop computer, into which the software clone including compromised device keys 14 has been loaded.

When the test device 12 is a PC or other appropriate computer, it is programmed with a forensic test module 16 to behave like a player-recorder in playing content on disks, although actual disks need not be provided. Instead, the test device 12 is provided with a forensic media key block (MKB) 18, the details of which are more fully disclosed below, that is accessed by the forensic test module 16 to undertake the present logic as though the forensic MKB were an MKB on a disk. The processor of the player-recorder 14 accesses the module 16 to undertake the logic shown and discussed below, which may be executed by a processor as a series of computer-executable instructions.

The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

For a full understanding of the details of the preferred broadcast encryption scheme and how it can be used to defeat unauthorized copyists, reference is made to the above-referenced patent application. To summarize the preferred broadcast encryption logic set forth therein, however, a device key matrix is generated, with each device key $S_{j,i}$ being a random number of predetermined bit size. Per present principles, i=the integers from 1 to N inclusive and j=the integers from 1 to M inclusive. "I" is a key index variable and "j" is a sets index variable. Each authorized player-recorder is then assigned selected keys "S" from the matrix by a licensing agency. For example, a first player-recorder might be assigned the keys $S_{3,1}, S_{5,2}, S_{1,3}, S_{1,4}, S_{6,5}, S_{4,6}$, and $S_{8,7}$. In any case, each player-recorder is assigned "N" device keys, and each player-recorder is assigned one and only one device key "S" for each key index variable "i". Embodiments, however, wherein a device might not include a device key for each and every $i^{th}$ position are within the scope of the above-referenced invention.

In any case, no single authorized player-recorder learns two keys at the same position in the key index dimension. Preferably, no player-recorder has exactly the same device keys "S" as any other device, although the device keys of many devices might overlap.

When an authorized player-recorder receives content on, e.g., a disk, the content, which has been encrypted by means of one or more of the system device keys in combination with a media-specific key to render a so-called "media key block" (MKB) (also referred to in the first of the above-referenced applications as a "session key block"), the player-recorder can decode the MKB and thereby decode and play the content. Further details of this operation is found in the above-referenced applications.

Compromised device keys can be revoked as described in the referenced applications, once the identities of the compromised keys are known. The present invention answers the question, with potentially a large number of device keys in existence, how can the identity of compromised keys as might be possessed by a clone be efficiently determined?

Figure 2:
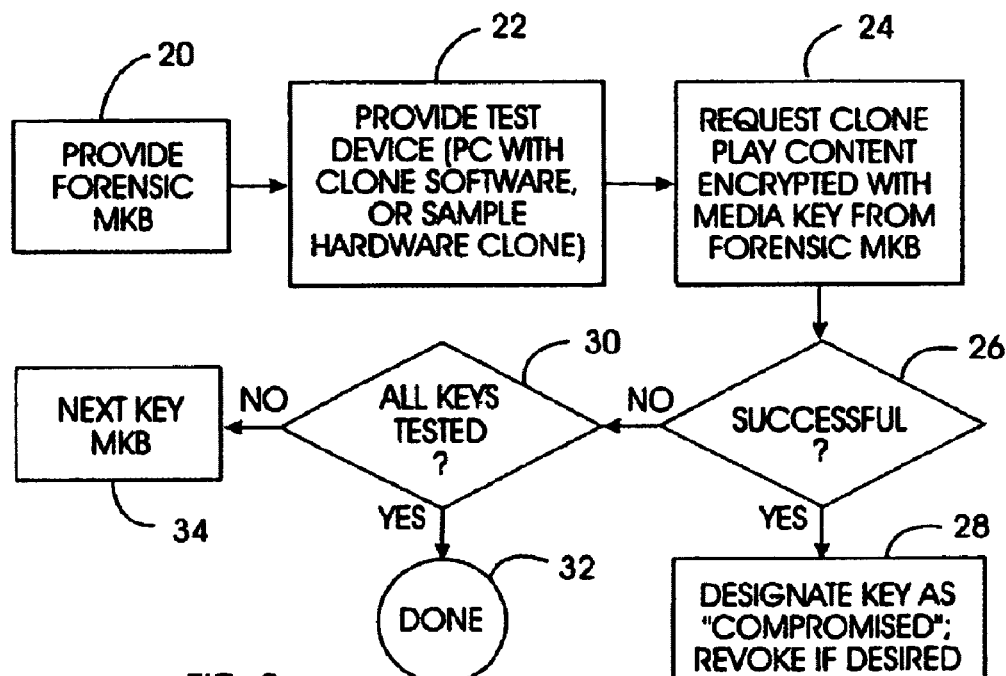
FIG. 2 is a flow chart of the overall logic.

The general logic to answer this question can be found in FIG. 2. Commencing at block 20, a forensic MKB is provided, preferably in accordance with the logic shown in FIG. 4 and described below. Essentially, a forensic MKB represents at least one column from the entire system MKB matrix in which each media key can be selectively revoked or not. In the forensic MKB, the revocation status of all associated device keys is known. A media key can be revoked by encrypting the associated device key with a dummy number to render a media key that, if decrypted, will not yield a content decryption key and thus cannot be used for decrypting content that has been encrypted. In any case, the status of each device key in the forensic MKB, either revoked or not, is known on a key by key basis.

Moving to block 22, the test device 12 is provided. As mentioned above, the test device 12 likely is a PC with clone software loaded therein, but it could also be a hardware clone. In either case, the test device 12 establishes a clone.

Proceeding to block 24, content is provided to the test device 12 in the form of a disk. It is to be understood that more preferably, in the case of a software clone, the forensic test module 16 is programmed to cause the test device 12 to think that it has a disk installed. In any case, the content on whatever media it happens to be is encrypted with a known media key having an associated known device key, and the test device 12 with, e.g., clone software is asked to play the content. To do this, the clone must access the forensic MKB 18, use its compromised device key or keys to decrypt the media key therefrom, and then use the result to decrypt the "content", for the clone to successfully play the content.

At decision diamond 26 it is determined whether the clone successfully played the content. This determination can be made by software programmed to detect musical or voice patterns, or it can be made by a human listening to the output of the test device 12.

If the clone can play the content, this means that the device key possessed by the clone is the known device key associated with the known media key, and the logic flows to block 28 to designate the known device key as a compromised key. It can then be revoked throughout the content guard system in accordance with previous disclosure. On the other hand, if the clone cannot play the content, the logic moves from decision diamond 26 to decision diamond 30, wherein it is determined whether all device keys in the MKB have been tested. If they have, the process ends at state 32; otherwise, the next forensic key and/or MKB column is retrieved at block 34, and the process repeats by looping back to block 24.

FIG. 3 shows a preferred implementation of the logic shown in FIG. 2. As recognized by the present invention, the above generalized process can be tedious, since, for instance in the case of DVD audio, hundreds of thousands of observations might be required to test all the possible forensic MKBs at decision diamond 26. Accordingly, the logic shown in FIG. 3 uses a binary search to optimize the process. It is to be understood that while the term "DVD disk" or just "disk" is used to described the media being protected, the present invention applies equally to other types of media, including flash memory, hard disk, etc.

Commencing at block 36, a forensic test MKB is provided with all unrevoked keys therein establishing a set "A". Initially, the test MKB has all keys unrevoked, i.e., in the "A" set. The forensic MKB preferably is a single column of media keys from the content guard system MKB described in the above-referenced applications. Moving to block 38, a fraction of, preferably one-half of, the keys in the "A" set are revoked (and their identities recorded). These keys establish a "B" set, and the remaining unrevoked keys establish the "A" set.

Proceeding to decision diamond 40, it is determined whether the clone can play the content. If it cannot, meaning that its compromised device keys must belong to the "B" set, the keys in the "A" set are exchanged with the keys in the "B" set at block 42. From block 42, or from decision diamond 40 if the test there indicates that the compromised key or keys are in the "A" set, the logic moves to decision diamond 44.

At decision diamond 44, it is determined whether more than one key remains in the (unrevoked) "A" set. If only one key remains, this key must consequently be a compromised key, and so the logic returns "compromised" at block 46.

The key can subsequently be revoked throughout the content guard system as detailed in the above-referenced applications.

The present invention still further recognizes that it might be possible for a clone to possess more than one device key per MKB column. Accordingly, from block 46 the logic proceeds to block 48 to revoke the compromised key in the test MKB and unrevoke all other keys in the MKB, placing them in the "A" set. At decision diamond 50 it is determined whether the clone can play the content. If it cannot, meaning that the clone has only the compromised key identified at block 46 for that test MKB, the process ends at state 52. Otherwise, a positive test at decision diamond 50 indicates that the clone possesses at least one other key in the MKB, and the process loops back to block 36, wherein the forensic MKB is provided with all keys except the compromised key identified at block 46 being unrevoked and, hence, in the "A" set.

By using the above-described binary search method, the number of observations required is reduced dramatically. However, a new MKB (in the sense that the revocation status of at least one of its keys must be changed) must be provided at block 36 for each iteration, based on the result of the previous iteration. This can be time consuming, since the MKBs are produced in a highly secure server, because it must have all the keys in the system. This server can be expected to be behind several locked doors, each of which can be expected to require two different people's physical keys to unlock. The test device 12 cannot simply be located in the server vault, since doing so would risk damage to the server by the clone software. Consequently, test personnel would have to enter the server room and retrieve the new MKB for each iteration, an appreciably tedious process.

FIG. 4 shows a way to avoid this time-consuming and tedious chore. Essentially, two "universal" MKBs are first produced at block 54 for each MKB column. The universal MKBs are identical to each other, except that one has all keys revoked while the other has no keys revoked, as indicated at blocks 56 and 58. An insecure server can then merge the two universal MKBs as needed at block 60 by selecting data from the revoked universal MKB or the unrevoked universal MKB for each key position to render the associated key into the "A" set or "B" set as required by the logic above. In this way, an insecure server can quickly produce a single test MKB with individual keys properly revoked (or not) to undertake the preferred logic of FIG. 3, including "swapping" keys in the "A" and "B" sets. Thus, it is to be understood that the above-disclosed step of "swapping" keys might be done not only by actually exchanging keys in a single MKB, but also by providing what is effectively a new MKB by appropriately merging the universal MKBs.

While the particular FORENSIC MEDIA KEY BLOCK FOR IDENTIFYING COMPROMISED KEYS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

I claim:

1. A system for identifying one or more compromised device keys of a content guard system, comprising:
    a test device accessing the compromised device keys; and
    a media key block (MKB) accessible to the test device, the MKB being a forensic MKB including plural media keys at least one of which media keys can be decrypted by the test device using a compromised device key to play content and at least one of which media keys cannot be decrypted by the test device using a compromised device key.

2. The system of claim 1, further comprising a forensic test module accessible to the test device, the module being programmed with logic to undertake method acts comprising:
    attempting to play content by decrypting at least a portion of the forensic MKB using at least one device key; and
    generating a signal representative of whether the device key is a compromised device key, based on the attempting act.

3. The system of claim 2, wherein the signal indicates the device key is a compromised device key when the test device successfully plays the content by using the device key to successfully decrypt at least a portion of the forensic MKB.

4. The system of claim 1, wherein a valid media key useful for decrypting the content is rendered when the device key successfully decrypts at least a portion of the forensic MKB.

5. The system of claim 1, further comprising a forensic test module accessible to the test device, the module being programmed with logic to undertake method acts comprising:
    (a) providing at least one test MKB having unrevoked media keys establishing a first set;
    (b) revoking a fraction of the media keys in the first set, unrevoked media keys being in the first set and revoked media keys establishing a second set;
    (c) determining whether the test device can successfully play the content;
    (d) if the test device cannot successfully play the content, exchanging the keys in the first set with the keys in the second set;
    (e) after the exchanging act in act (d) or if it is determined at act (c) that the test device can successfully play the content, determining whether more than one media key exists in the first set; and
    (f) returning "compromised key" when only a single media key exists in the first set, and otherwise repeating at least acts (b)–(f).

6. The system of claim 5, wherein the method acts embodied by the logic further comprise:

after "compromised key" has been returned, revoking the compromised key and repeating at least acts (b)–(f).

7. The system of claim 1, further comprising a forensic test module accessible to the test device, the module being programmed with logic to undertake method acts comprising:
    providing a first MKB having all keys unrevoked;
    providing a second MKB having all keys revoked; and
    selecting keys from the first and second MKBs to render the test MKB.

8. A computer-implemented method for identifying compromised device keys in a digital content guard system, comprising the acts of:
    providing at least one clone with at least one suspected compromised device key;
    attempting to play content by decrypting at least a portion of a media key block (MKB) using at least one device key; and
    generating a signal representative of whether the device key is a compromised device key, based on the attempting act.

9. The method of claim 8, wherein the signal indicates the device key is a compromised device key when the clone successfully plays the content by using the device key to successfully decrypt at least a portion of the MKB.

10. The method of claim 9, wherein a valid media key useful for decrypting the content is rendered when the device key successfully decrypts at least a portion of the MKB.

11. The method of claim 8, further comprising:
    (a) providing at least one test MKB having unrevoked media keys establishing a first set;
    (b) revoking a fraction of the media keys in the first set, unrevoked media keys being in the first set and revoked media keys establishing a second set;
    (c) determining whether the clone can successfully play the content;
    (d) if the clone cannot successfully play the content, exchanging the keys in the first set with the keys in the second set;
    (e) after the exchanging act in act (d) or if it is determined at act (c) that the clone can successfully play the content, determining whether more than one media key exists in the first set; and
    (f) returning "compromised key" when only a single media key exists in the first set, and otherwise repeating at least acts (b)–(f).

12. The method of claim 11, further comprising:
    after "compromised key" has been returned, revoking the compromised key and repeating at least acts (b)–(f).

13. The method of claim 8, further comprising:
    providing a first MKB having all keys unrevoked;
    providing a second MKB having all keys revoked; and
    selecting keys from the first and second MKBs to render the test MKB.

14. A computer program device, comprising:
    a computer program storage device including a program of instructions usable by a computer, comprising:
    computer readable code means for providing a forensic media key block (MKB);
    computer readable code means for providing a clone having at least one device key compromised from a plurality of device keys in a digital content guard system, the identity of the compromised device key being unknown; and
    computer readable code means for determining the identity of the compromised device key based on whether the clone can decrypt at least a portion of the forensic MKB using the compromised device key.

15. The computer program device of claim 14, wherein the means for providing a forensic MKB further includes:
providing a first MKB having all keys unrevoked;
providing a second MKB having all keys revoked; and
selecting keys from the first and second MKBs to render the forensic MKB.

16. The computer program device of claim 14, wherein the means for determining further includes:
(a) computer readable code means for providing a forensic MKB having unrevoked media keys establishing a first set;
(b) computer readable code means for revoking a fraction of the media keys in the first set, unrevoked media keys establishing the first set and revoked media keys establishing a second set;
(c) computer readable code means for determining whether the clone can successfully play the content;
(d) computer readable code means for exchanging the keys in the first set with the keys in the second set if the clone cannot successfully play the content;
(e) computer readable code means for determining whether more than one media key exists in the first set after invocation of the means (d) for exchanging or if it is determined by the means (c) for determining that the clone can successfully play the content; and
(f) computer readable code means for returning "compromised key" when only a single media key exists in the first set, and otherwise iterating means (b)–(f).

17. The computer program device of claim 16, further comprising:
computer readable code means for revoking the compromised key and iterating at least means (b)–(f) after "compromised key" has been returned.

* * * * *